United States Patent [19]

Akao et al.

[11] 4,147,291

[45] Apr. 3, 1979

[54] PACKING BAG FOR LIGHT-SENSITIVE MATERIAL

[75] Inventors: Mutsuo Akao; Taichi Kurechi, both of Minami-ashigara, Japan

[73] Assignee: Fuji Photo Film Co., Ltd., Minami-ashigara, Japan

[21] Appl. No.: 785,709

[22] Filed: Apr. 7, 1977

[30] Foreign Application Priority Data

Apr. 7, 1976 [JP] Japan ............................ 51-427762[U]

[51] Int. Cl.$^2$ ........................ B32B 15/08; B32B 27/08; B65D 65/40; B65D 83/02
[52] U.S. Cl. .................................. 229/55; 229/3.5 R; 229/3.5 MF; 128/218; 128/416; 128/516; 128/910
[58] Field of Search ................. 428/35, 218, 461, 516, 428/910; 229/55, 3.5 R, 3.5 MF, 88

[56] References Cited

U.S. PATENT DOCUMENTS

| | | | |
|---|---|---|---|
| 2,956,723 | 10/1960 | Tritsch | 229/3.5 R |
| 3,321,125 | 5/1967 | Quackenbash et al. | 229/55 |
| 3,445,055 | 5/1969 | Port et al. | 428/910 |
| 3,816,230 | 6/1974 | Carreras et al. | 229/3.5 R |
| 3,829,007 | 8/1974 | Ellison | 229/55 |
| 3,973,063 | 8/1976 | Clayton | 428/35 |

Primary Examiner—J. C. Cannon
Attorney, Agent, or Firm—Sughrue, Rothwell, Mion, Zinn and Macpeak

[57] ABSTRACT

A packing bag, particularly suitable for use for light-sensitive materials, composed of a composite laminate which comprises a cross laminate film of two uniaxially stretched high density polyethylene films wherein the stretching directions of the two films cross each other at an angle of about 45° to about 90° C. and a low density polyethylene film containing a light-intercepting agent and an antistatic agent, wherein the bag is so constructed that the low density polyethylene film surface of the laminate film is the interior surface of the packing bag.

19 Claims, 5 Drawing Figures

PACKING BAG FOR LIGHT-SENSITIVE MATERIAL

BACKGROUND OF THE INVENTION

1. Field of the Invention

The present invention relates to packing bags particularly suitable for use for light-sensitive materials and particularly to packing bags having improved physical strength, light-intercepting properties and antistatic properties.

2. Description of the Prior Art

Generally, packing bags which completely intercept light are used for packing goods whose value is destroyed or damaged upon exposure to light, such as light-sensitive materials. Such packing bags must have sufficient physical strength, that is, tensile strength, tearing strength and bursting strength, depending on the size or weight of the goods to be packed. Further, in packing light-sensitive materials in the packing bags, the bags must have a heat-sealing property, because it is necessary to completely seal the opening by heat-sealing to ensure light-interception and moisture proofing properties. In addition, where the packing bags are to be used for photographic light-sensitive materials, the packing bags must have antistatic properties in order to prevent generation of static charges due to the friction of the bag with the photographic light-sensitive material, since discharge of the static charges deleteriously affects photographic light-sensitive materials.

Hitherto, as packing bags whose properties as described above, such as light-intercepting property, physical strength, heat-sealing property or antistatic properties, etc., are statisfactory, laminates composed of a low density polyethylene film containing carbon black or pigments and paper, aluminum foil or cellophane have been widely used.

Such prior packing bags, however, have the disadvantages that they have poor physical properties such that tearing can occur or openings form during the packing operation or their size in easily changed due to stretching.

In order to eliminate such disadvantages, it is necessary to increase the thickness of the material from which the packing bags are made and, consequently, the resulting packs become bulky, heavy and expensive.

SUMMARY OF THE INVENTION

An object of the present invention is to provide lightweight, inexpensive packing bags having sufficient physical strength, light-intercepting property and antistatic properties by eliminating the above described disadvantages.

The object of the present invention has been attained by providing a packing bag for a light-sensitive material composed of a composite laminate which comprises a cross laminate film comprising two uniaxially stretched high density polyethylene films wherein the stretching directions of the two films cross each other at an angle of about 45° to about 90° and a low density polyethylene film containing a light-intercepting agent and an antistatic agent, wherein the bag is so constructed that the low density polyethylene film surface of the laminate film is the interior surface of the packing bag.

DETAILED DESCRIPTION OF PREFERRED EMBODIMENTS

The packing bags of the present invention are composed of a high density polyethylene cross laminate film which has sufficient physical strength but poor light-intercepting and heat-sealing properties and a low density polyethylene film having a good heat-sealing property but poor physical strength, which is capable of having a light-intercepting property and an antistatic property by addition of carbon black or pigments, by which the individual disadvantages of the two films can be compensated for.

Embodiments of the packing bags of the present invention are illustrated by reference to the following drawings.

Figure 1:
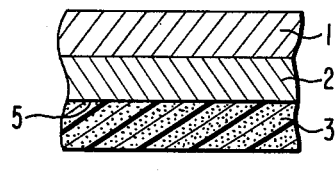
FIG. 1 is a partial sectional view of a packing bag comprising a 3-layer laminate of the present invention.

FIG. 1 is a partial sectional view of the present invention which shows a layer structure.

In the FIG. 1, 1 is a uniaxially stretched high density polyethylene film which has been stretched in a specific direction e.g., in a stretching ratio of about 2 to 6 times, preferably 3 to 4 times, its original length, and 2 is a uniaxially stretched high density polyethylene film e.g., also in a stretching ratio of about 2 to 6 times, preferably 3 to 4 times, its original length, contacting the above described film 1 so that the stretching directions of the two films cross each other at an angle of about 45° to about 90° and preferably 75° to 90°. The degree of stretching of these two high density polyethylene films can be varied if desired but too great a difference in the degree of stretching of the two films can give rise to problems such as curling. The high density polyethylene films 1 and 2 are then laminated at a heat-sealing temperature of about 180° C. to about 250° C. preferably about 200° C. to about 230° C.

3 is a low density polyethylene film which contains carbon black or a pigment (e.g., $TiO_2$, Clay, $CaCo_3$, $SiO_2$ talc etc.) as a light-intercepting agent, carbon black or a surface active agent (e.g., N,N-bis(2-hydroxyethylcocoamine), oxalic acid-N,N'-distearylamidobutylester, stearyldiethanolamine, and cationic materials) as an antistatic agent, a synthetic resin (e.g., polybutene, polyisobutylene, polyisoprene, styrenebutadiene copolymers, nitrile rubbers, etc.) as a viscoelasticity improving agent, a plasticizer and, if desired, an antioxidant (e.g., 2,6-di-t-butyl-p-cresol, phenyl-$\beta$-napthylamine, etc.) or an ultraviolet light absorbing agnet (e.g., $\alpha$-hydroxy-$\phi$-octoxybenzophenone, $\alpha$-(2'-hydroxy-3',5'-di-t-butylphenol)5-chlorobenzotriazole, 4-t-butylphenylsalicylate, etc.) in appropriate amounts to achieve the function desired. It can be seen that where carbon black is used, such can function not only as a light-intercepting agent but also an anti-static agent.

The amount of carbon black which can be added in cases of the high density polyethylene film is up to about 2.5% by weight. Thus, if the amount of carbon black is above about 2.5% by weight, carbon black separates from the film or the film becomes fragile and stretching the film becomes difficult. Accordingly, the light-intercepting property and the antistatic property can not be satisfied by adding carbon black to the high density polyethylene film. On the contrary, in cases of the low density polyethylene film 3, carbon black can be added in an amount of up to about 12% by weight, e.g., about 2.5% to about 12% by weight. In embodiments of the present invention, carbon black is added in an amount of about 3% to about 7% by weight achieve a light-intercepting property and antistatic properties. It is preferred to use a pigment with carbon black, since when such is used the amount of carbon black can be decreased.

With respect to these high density and low density polyethylene films, for the high density polyethylene used a suitable density can be about 0.94 g/cm³ or higher, a suitable melting point can range from about 120° to about 140° C. and a suitable degree of crystallization can be about 75% or higher and, for the low density polyethylene used, a suitable density can range from about 0.91 to about 0.92 g/cc, a suitable melting point can range from about 110° to 112° C. and a suitable degree of crystallization can be about 65% or less. These properties are merely exemplary and are not to be construed as being critical.

The above described high density polyethylene films 1 and 2 are laminated to the low density polyethylene film 3 using a polyurethane adhesive together with an isocyanate hardening agent, or an available hot-melt type adhesive such as DPDB 6169 made by Union Carbide Co.

The composite laminate film having such a layer structure comprises a cross laminate composed of uniaxially stretched high density polyethylene films 1 and 2 wherein the crystal arrangement of polyethylene molecules caused by stretching has a network structure. Accordingly, the film is very strong and torn by stretching only with difficulty. Further, it does not break or tear from scratches even if scratching occurs. Furthermore, it has an excellent water proofing properties.

Further, since this cross laminate film comprises a low density polyethylene film 3 containing a light-intercepting agent or an antistatic agent, it is suitable for making packing bags, because the light-intercepting property, the antistatic property and the heat-sealing property of the laminate film have been improved.

Figure 5:
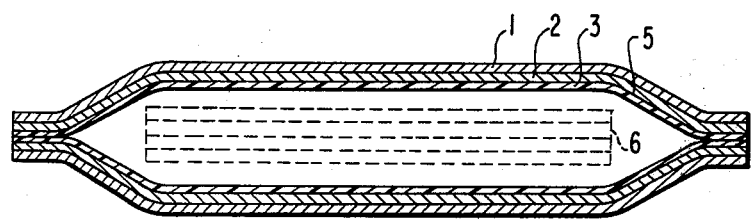
FIG. 5 is a section view of a packing bag of the present invention where it is used for packing light-sensitive materials.

In using the packing bags of the present invention for light-sensitive materials as shown in FIG. 5, the inside of the bags which always contacts the light-sensitive materials and is subjected to friction should be composed of the low density polyethylene film 3.

The reason for this is the generation of static charges caused by the friction of the inside of the packing bag with the light-sensitive materials 6 can be prevented and heat-sealing can be carried out at a low temperature.

More specifically if the inside of the packing bag is composed of the high density polyethylene film 1, the photographic sensitive materials 6 and the high density polyethylene film 1 are electrostatically charged by friction with static marks occurring and the temperature must be elevated at heat-sealing to the heat-sealing point of the high density polyethylene film, with heat-fog occurring due to the high temperature. On the contrary, if the inside of the packing bags is the low density polyethylene film, electrostatic charges caused by friction can be prevented, because the low density polyethylene film 3 contains carbon black or a surface active agent as an antistatic agent, and it is possible to heat-seal at a comparatively low temperature, because the heat sealing can be carried out at the heat-sealing point of the low density polyethylene, and the occurrence of heat fog can be prevented.

Figure 3:
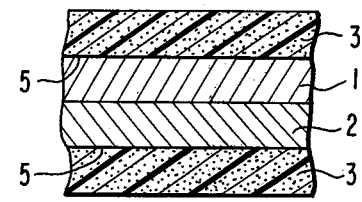
FIGS. 2, 3 and 4 are each a partial sectional view of a packing bag comprising a 4-layer laminate of the present invention.
Figure 2:
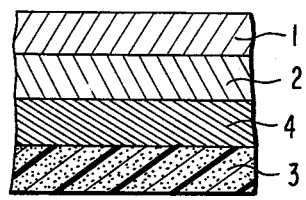
Figure 4:
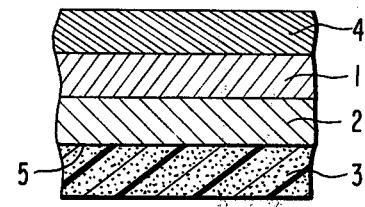

The packing bags of the present invention include not only the above described 3-layer laminate but also the 4-layer laminates shown in FIGS. 2, 3 and 4 and composite laminates which have at least one additional layer such as a layer of a low density polyethylene film, cloth, paper, cellophane, a synthetic resin sheet, a flat yarn (i.e., a cloth knitted from slits from a synthetic resin film) or aluminum foil, etc. in the fundamental layer structures shown in FIGS. 1 and 2.

In a laminate film having the layer structure shown in FIG. 2, an intermediate layer 4 which does not melt at the heat-sealing point of the high density polyethylene, such as the above described cloth, paper, cellophane, synthetic resin film or aluminum foil, etc. is sandwiched between a cross laminate film composed of high density polyethylene films 1 and 2 and a low density polyethylene film 3. In this case, since the laminate is produced by heat-sealing without using expensive adhesives, it can be widely utilized, and the physical strength, the light-interecpting property and the antistatic properties thereof are further ensured. Further, in general, it is highly desirable for the packing bag to be heat stable since heat-sealing is almost always employed to close the packing bag. Aluminum foil is most preferred for the intermediate layer since aluminum foil is useful for providing a light-intercepting property, an antistatic property and a mositure proof property to the packing bag.

As described above, in order to produce the laminate film from the high density polyethylene films 1 and 2 and the low density polyethylene film 3, a method which comprises bonding them directly using an adhesive 5 and a method which comprises heat-sealing through the intermediate film 4 can be used. The reason why the expensive adhesive is used in the former method without heat-sealing is due to the difference in the melting point of the high density polyethylene films 1 and 2 and that of the low density polyethylene film 3.

Namely, if heat-sealing of the above described films 1, 2 and 3 is carried out, the temperature must be elevated to 200° C. or so which is the heat-sealing point of the high density polyethylene films 1 and 2, and consequently a good laminate film can not be obtained, because the low density polyethylene film completely melts at a temperature of near 200° C. because it has a melting point of about 120° C. Accordingly, an adhesive is required in the former case. On the contrary, in the latter case, the high density polyethylene cross-laminate film 1, 2 is first bonded to the intermediate film 4 by heat-sealing at a temperature of 200° C. or so and then the intermediate layer 4 of the resulting laminate film is bonded to the high density polyethylene film 3 by heat-sealing at a temperature of 120° C. or so.

FIG. 4 shows a laminate film wherein the low density polyethylene film 3 is positioned on one side of the high density polyethylene cross laminate film 1, 2 and an intermediate layer 4 of an aluminum foil is positioned on the other side of the cross laminate film, which has nearly the same effect as that shown in FIG. 3 when used as a packing bag.

In the above described embodiments, since the laminate films are used as packing bags for light-sensitive materials, it is necessary for at least one of the outside layers to be composed of a low density polyethylene film having antistatic properties. However, the packing bags according to the present invention can be widely utilized for packing not only light-sensitive materials but also foodstuffs which are deteriorated markedly by light such as oils and fats, etc., or chemicals, etc. Further, the layer structure of the composite laminate film of the invention is not limited to the above described embodiments.

An example is described in the following in order to illustrate in greater detail the effect of the packing bag of the present invention.

EXAMPLE

A packing bag for light-sensitive material of the present invention shown in FIG. 1 composed of a 3-layer laminate film comprising a high density polyethylene cross laminate film having a thickness of 80μ and a low density polyethylene film having a thickness of 50μ and containing carbon black in an amount of 6% by weight was compared with a prior art packing bag for light-sensitive materials which was composed of a 4-layer laminate film comprising an extensible kraft paper sheet having a thickness of 5μ, a low density polyethylene film having a thickness of 70μ and containing carbon black in an amount of 4.5% by weight, an aluminum foil having a thickness of 10μ and a low density polyethylene film having a thickness of 50μ and containing carbon black in an amount of 6% by weight from the standpoint of physical strength, light-intercepting property, water proofing properties, heat-sealing property and cost. The results obtained are shown in the following table.

|  | Packing Bag of the Present Invention | Packing Bag of the Prior Art |
| --- | --- | --- |
| Total Thickness (μ) | 130 | 180 |
| Light-Intercepting Property | C | C |
| Tearing Strength (length) | A (650 g) | D (180 g) |
| Tearing Strength (width) | A (1500 g) | D (290 g) |
| Bursting Strength (length) | B (4 kg/m$^2$) | C (3.2 kg/m$^2$) |
| Tensile Strength (length) | B (7.5 kg/1.5 cm) | C (4.8 kg/1.5 cm) |
| Water-Proofing Property | C | C |
| Heat-Sealing Property | C | C |
| Cost | B | E |

Explanation of marks
A = Remarkably excellent, B = Excellent,
C = Practical, D = Difficulties exist,
E = Obviously poor (or cost high).

As described above, packing bags having the 3-layer structure of the present invention have excellent physical strength and a low cost as compared to the prior art packing bags having a 4-layer structure.

While the invention has been described in detail and with reference to specific embodiments thereof, it will be apparent to one skilled in the art that various changes and modifications can be made therein without departing from the spirit and scope thereof.

What is claimed is:

1. A packing bag for light-sensitive materials which comprises a cross laminate film of two uniaxially stretched high density polyethylene films wherein the stretching directions of the two films cross each other at an angle of about 45° to about 90° and a low density polyethylene film containing a light-intercepting agent and an antistatic agent, wherein for low density polyethylene film surface of said cross laminate is the interior surface of said bag.

2. The packing bag of claim 1 including at least one additional layer selected from the group consisting of a layer of a low density polyethylene film cloth, paper, cellophane, a synthetic resin sheet, a flat yarn and aluminum foil.

3. The packing bag of claim 1 wherein an adhesive is used for lamination.

4. The packing bag of claim 1 wherein the high density polyethylene films are heat-sealed to one another for lamination.

5. The packing bag of claim 1, wherein the light-intercepting agent and the antistatic agent is carbon black.

6. The packing bag of claim 5 wherein the carbon black is present in an amount of up to about 12% by weight of the low density polyethylene film.

7. The packing bag of claim 6 wherein the carbon black is present in an amount of about 2.5% to about 12% by weight of the low density polyethylene film.

8. The packing bag of claim 1, additionally including an intermediate layer which has superior heat stability than said uniaxially stretched high density polyethylene films and is capable of bonding to both of said polyethylene films.

9. The packing bag of claim 8, wherein the intermediate layer is an aluminum foil layer.

10. The packing bag of claim 1 wherein the uniaxially stretched high density polyethylene films have been stretched at a stretching ratio of about 2 to 6 times.

11. The packing bag of claim 10 wherein the stretching ratio is 3 to 4 times.

12. The packing bag of claim 1 wherein the light-intercepting agent is carbon black or a pigment.

13. The packing bag of claim 12 wherein the pigment is $TiO_2$, clay, $CaCO_3$, $SiO_2$ or talc.

14. The packing bag of claim 1 wherein the low density polyethylene film contains a synthetic resin.

15. The packing bag of claim 14 wherein the synthetic resin is polybutene, polyisobutylene, polyisoprene, styrenebutadiene copolymer or nitrile rubber.

16. The packing bag of claim 1, wherein the high density polyethylene film has a density of about 0.94 g/cm$^3$ or higher.

17. The packing bag of claim 16 wherein the high density polyethylene has a melting point from about 120° to 140° C. and a degree of crystallization of about 75% or higher.

18. The packing bag of claim 1 wherein the low density polyethylene has a density from about 0.91 to about 0.92 g/cc.

19. The packing bag of claim 18 wherein the low density polyethylene has a melting point from about 110° to 112° C. and a degree of crystallization of about 65% or less.

* * * * *

UNITED STATES PATENT AND TRADEMARK OFFICE
CERTIFICATE OF CORRECTION

PATENT NO. : 4,147,291
DATED : April 3, 1979
INVENTOR(S) : Mutsuo AKAO et al

It is certified that error appears in the above-identified patent and that said Letters Patent are hereby corrected as shown below:

IN THE HEADING:

Foreign Application Priority Data:

Delete "51-427762[U]" insert -- 51-42762[U] --

Signed and Sealed this

Twenty-sixth Day of June 1979

[SEAL]

Attest:

RUTH C. MASON
Attesting Officer

DONALD W. BANNER
Commissioner of Patents and Trademarks